June 19, 1934.  F. E. DEEMS  1,963,262
HULL EXTRACTOR FOR COTTON
Filed Nov. 3, 1930
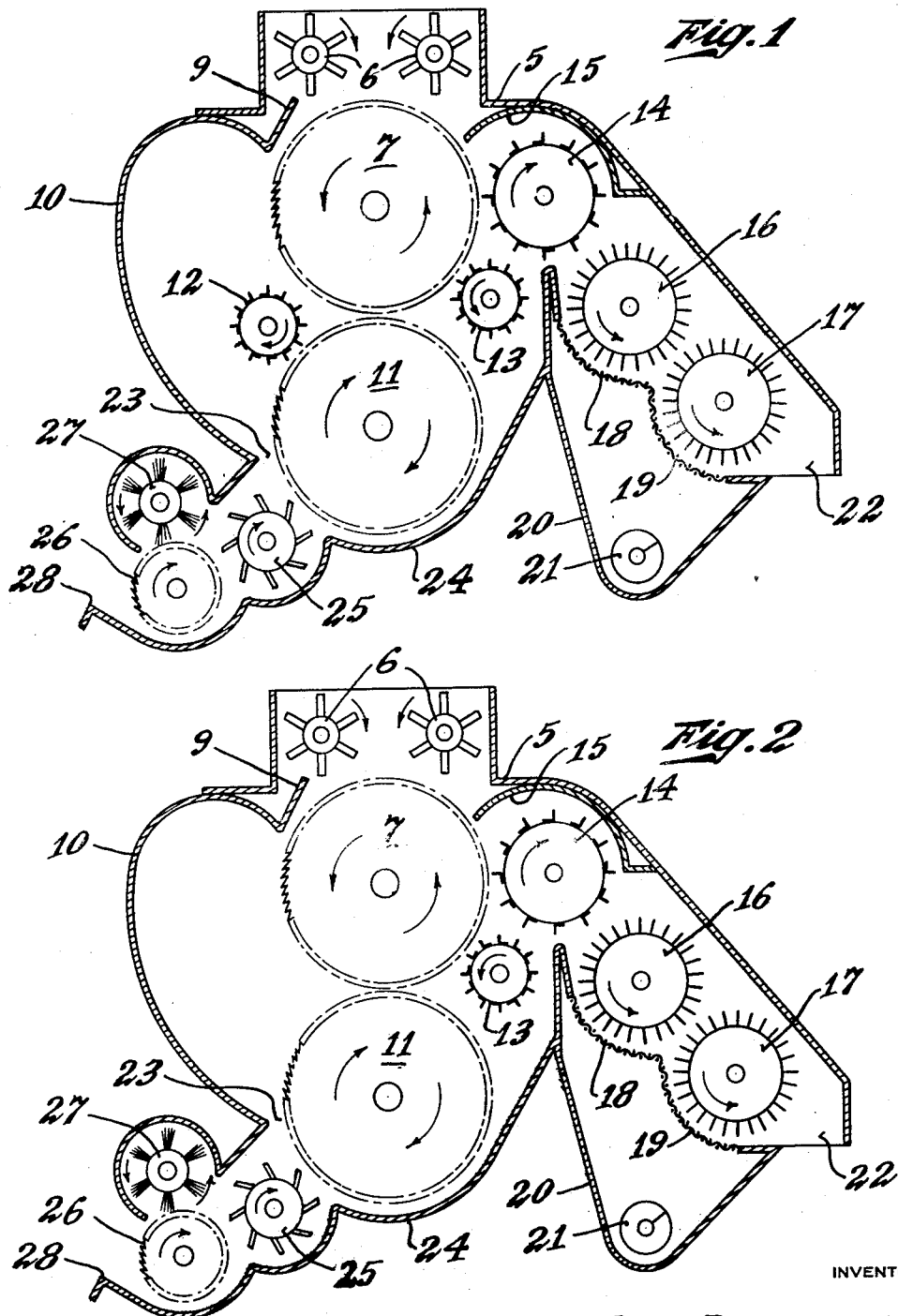

Patented June 19, 1934

1,963,262

UNITED STATES PATENT OFFICE 1,963,262

HULL EXTRACTOR FOR COTTON

Frank E. Deems, Birmingham, Ala., assignor to Continental Gin Company, a corporation of Delaware Application November 3, 1930, Serial No. 493,102

8 Claims. (Cl. 19—37)

My invention relates to hull extracting apparatus for seed cotton and the like in which the seed cotton and hulls are delivered to an upper saw cylinder and are carried thereby on its downgoing side into a treatment chamber which contains a second saw cylinder arranged below the upper saw cylinder and in position to act on the hulls and that portion of the cotton that are centrifugally discharged from the downgoing side of the upper saw cylinder. The seed cotton engaged by the lower saw is returned and doffed onto the upper saw cylinder and the combined streams of cotton are carried by the upgoing side of the upper saw cylinder past a stripping means to the doffing point.

My present invention distinguishes from the cotton hull extractor apparatus forming the subject matter of a companion application Serial No. 493,101, filed of even date herewith, in that I have dispensed with any stripping means on the downgoing side of the upper saw cylinder, as I have found that under certain conditions the upper saw will throw off a substantial portion of the hulls along with some cotton responsive to the action of centrifugal force and the hulls and cotton thus ejected will pass for treatment to the lower saw cylinder.

Preferably, the lower saw cylinder has associated therewith a stripper roller working on its upgoing side, but under certain conditions this may be dispensed with as all of the cotton can be stripped on the upgoing side of the upper saw cylinder.

My present invention also contemplates that the escaping hulls along with any adhering cotton must pass a reclaiming saw having associated with it means to return the cotton reclaimed from the hulls to the lower saw cylinder and to control the discharge of the cleaned hulls from the extractor casing.

My invention further comprises the novel details of construction and arrangements of parts, which in their preferred embodiments only are illustrated in the accompanying drawing which forms a part of this specification, and in which:—

Fig. 1 is a vertical transverse cross-sectional view taken through a cotton hull extractor casing with the driving means omitted and the arrows indicating the direction of rotation of the working parts.

Fig. 2 is a view similar to Fig. 1 showing a modification in which the stripping operation on the upgoing side of the lower saw cylnder is omitted.

Similar reference numerals refer to similar parts throughout the drawings.

In the embodiment of my invention illustrated, the seed cotton with the accompanying hulls and trash is fed into the top of the extractor casing 5 through any suitable inlet, preferably by a feed means such as the feed rolls 6 which rotate reversely and afford a positive regulated feed of cotton and hulls into the casing for treatment.

Below and juxtaposed to the feed rolls is the upper saw cylinder 7 which is disposed to receive the cotton and hulls from the feed rollers and to carry them in a counterclockwise direction downwardly into the working chamber of the casing. The hulls and cotton are first carried past a curved guide 9 beyond which the casing opens up so that the hulls and heavier trash carried by the cotton that is engaged by the teeth of the saw cylinder 7 will be free, responsive to centrifugal force, to be thrown outwardly against a curved wall 10 of the casing, which serves as a hull board means for the lower saw cylinder 11. As thus thrown the hulls are diverted from the main cotton stream instead of being knocked back into the said stream as is customary.

The saw cylinder 11 rotates in the opposite direction to the upper saw cylinder 7 and with a relatively lower peripheral speed. Preferably, this lower saw is disposed so that it can be doffed by the upper saw, but any suitable doffing means may be substituted for direct action to effect a transfer of seed cotton in a stream from the lower saw cylinder onto the other.

In Fig. 1 I show the lower saw cylinder 11 having associated therewith on its upgoing side a stripper roller 12.

In Fig. 2 I omit this stripper roller 12 because under certain conditions, and when treating certain grades of cotton, it may be desirable to dispense with this stripping operation. The stripper roller 12 is so disposed as to be out of the path of the greater part of the hulls and cotton centrifugally ejected from the downgoing side of the upper saw cylinder 7 and is disposed to coact with the upper portion of the upgoing side of the lower saw cylinder. It is spaced so as to have no co-operation or doffing function in respect to the upper saw cylinder.

After the stream of cotton has been doffed from the lower saw cylinder and merged with the stream of cotton on the upper saw cylinder, these combined streams travel upwardly with the upper saw cylinder and if desired can be subjected to a final stripping action by the stripper roller 13 before being doffed by the doffer roller 14 and directed by the guide 15 to a series of cleaning cylinders 16 and 17 working over screen concaves 18 and 19. The stripper 13 also acts to divert the hulls it engages from further contact with the main cotton stream. The trash and dirt screened out passes into the hopper 20 and is carried off by a conveyor or any other suitable means 21, the seed cotton being delivered through a chute 22 to the gin or other point of use.

The action of the reclaiming means for cotton in the outgoing hulls is substantially that described in my companion application aforesaid and may be briefly described as follows.

Hulls escaping through the throat 23 between the hull board means 10 and lower saw cylinder 11 and the hulls carried around under the lower saw cylinder over the concave bottom 24 of the casing, will all come into position to be engaged by the picker roller 25 and will be delivered thereby, together with any accompanying cotton, respectively to the saw cylinder 11 and to the reclaiming saw 26. This saw, rotating in clockwise direction, will collect the cotton from the hulls and present it to its doffing means 27 which in turn will deliver it to the upper side of the picker roller 25, which in turn will deliver it back into position to be engaged by the lower saw cylinder 11. The hulls and trash after being cleaned of cotton will be gradually discharged over the overflow lip 28 on the upgoing side of the reclaiming saw. The height of this lip and its relative spacing to the reclaiming saw determine the rate of discharge of the hulls responsive to the action thereon of the teeth of the reclaiming saw.

In operation, cotton with accompanying hulls and bolls is fed at a uniform rate to the upper saw cylinder which receives them and carries them therewith downwardly into the working chamber of the casing. The hulls, and any accompanying cotton, that are centrifugally ejected from the downgoing side of the saw cylinder 7 and diverted from the main cotton stream are delivered to the lower saw cylinder 11 and the cotton engaged thereby is carried upwardly past the stripper roller 12, where used, and is doffed onto the upper saw. This saw 7 carries both streams of seed cotton upwardly past the stripper 13 and delivers it to the doffer 14 from whence it is discharged from the apparatus.

The hulls stripped from the cotton on both sides of the saw cylinders 7 and 11 find their way down to the reclaiming saw and are given a final treatment thereby before making their escape from the extractor casing. By this arrangement all of the cotton is stripped once, and that which is engaged by the lower saw may if desired be stripped twice, and all of the hulls after successive treatment by both saw cylinders are finally subjected to a cotton reclaiming operation before discharge.

It will be understood where I refer to a saw cylinder herein that by such term I mean to include any toothed element that will effectively engage the lint cotton and will permit hulls and trash to be stripped therefrom while carrying it around to the doffer. If desired the cleaning may be omitted and the seed cotton as doffed delivered directly to the gin or other point of use.

While I prefer to use the reclaiming saw 26 and its coacting elements as the most efficient means for recapturing the cotton that tends to make its escape with the hulls, nevertheless, in its broader aspect my invention is not limited to any particular means for recapturing cotton from the outgoing hulls.

Though, I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:—

1. A hull extractor for seed cotton and the like comprising a top inlet with feed rollers, two superposed reversely driven saw cylinders, the upper being adapted to receive the seed cotton from the feed rollers and by centrifugal force alone to strip hulls therefrom on its downgoing side and one saw cylinder being adapted to doff cotton from the other saw cylinder, hull board means to deliver the hulls and cotton centrifugally ejected from the downgoing side of the upper saw cylinder to the upgoing side of the lower saw cylinder, and means to doff the combined streams of cotton from the saw cylinder carrying them.

2. A hull extractor for seed cotton and the like comprising a top inlet with feed rollers, two superposed reversely driven saw cylinders, the upper being adapted to receive the seed cotton from the feed rollers to strip hulls therefrom on its downgoing side by centrifugal force alone and to doff cotton from the lower saw cylinder, guide means to deliver the hulls and cotton centrifugally ejected from the downgoing side of the upper saw cylinder to the upgoing side of the lower saw cylinder, means to doff the combined streams of cotton from the upper saw cylinder, and means acting on the cotton collected by the lower saw cylinder to strip it in advance of said doffing means.

3. A hull extractor according to claim 2, in which the last mentioned stripping means comprises two stripping rollers, one working on the upgoing side of the lower saw cylinder and the other on the upgoing side of the upper saw cylinder.

4. In a hull extractor, the combination with top feed rolls, an upper saw cylinder parallel with and juxtaposed to said rolls, hull board means in unobstructed relationship to the downgoing side of said upper saw cylinder to receive hulls centrifugally ejected therefrom and deliver same to the upgoing side of a lower saw cylinder, a lower saw cylinder oppositely rotatable to the upper saw cylinder and adapted to be doffed thereby, means to doff the combined streams of cotton from the upgoing side of the upper saw cylinder, means to apply a stripping operation to the cotton engaged by the lower saw cylinder, a reclaiming saw, means to bring all hulls separated from the cotton on both saw cylinders into engagement with said reclaiming saw before they escape from the extractor, and doffing means to cause the return of cotton collected by said reclaiming saw to said lower saw cylinder.

5. In a hull extractor for seed cotton, a casing having a top feed inlet and thereunder a pair of superposed saw cylinders reversely driven and arranged one to doff the other, the upper cylinder being left free of any mechanical stripper on its downgoing side and being adapted to eject hulls on that side with some accompanying cotton freely responsive to centrifugal force, means to deliver to the lower cylinder for treatment hulls and accompanying cotton that become centrifugally detached from the upper cylinder, and means to strip and doff the combined streams or cotton.

6. In a hull extractor for seed cotton, an inlet for seed cotton and hulls, an initial saw cylinder adapted to engage the entering cotton overhead and carry it downwardly so as to strip by centrifugal force hulls and some accompanying cotton, a secondary saw cylinder to the upgoing side of which such centrifugally ejected material passes directly from said initial saw cylinder and which is adapted to return the cotton collected thereby to said initial saw cylinder, means to define an outlet for the discharge of hulls past said secondary saw cylinder, and means to strip and doff said combined cotton streams on the upgoing side of said initial saw cylinder.

7. A hull extractor for seed cotton having a feed inlet and a pair of superposed saw cylinders reversely driven in a direction to pass the cotton they respectively collect between them and arranged one to doff the other, hull guide means to deliver to the lower cylinder for treatment hulls and accompanying cotton as they become detached from the downgoing side of the upper cylinder, and means to strip and doff the combined streams of cotton.

8. In a hull extractor, a pair of saw cylinders, means to cause the cotton to be treated by both cylinders in divided streams and to combine on one of said cylinders before being finally doffed, and means to strip hulls from the combined streams and discharge same so as not to intersect the path of the cotton in its approach to said cylinders.

FRANK E. DEEMS.